United States Patent [19]

Fussgäger

[11] Patent Number: 5,050,952

[45] Date of Patent: Sep. 24, 1991

[54] OPTICAL COMMUNICATIONS SYSTEM FOR DIPLEX OR DUPLEX TRANSMISSION

[75] Inventor: Kurt Fussgäger, Remseck, Fed. Rep. of Germany

[73] Assignee: Alcatel N. V., Amsterdam, Netherlands

[21] Appl. No.: 503,247

[22] Filed: Mar. 30, 1990

[30] Foreign Application Priority Data

Mar. 31, 1989 [DE] Fed. Rep. of Germany ....... 3910637

[51] Int. Cl.$^5$ .............................................. G02B 6/28
[52] U.S. Cl. ................................... 359/114; 359/127; 359/116; 385/24
[58] Field of Search ............................ 455/612, 601; 350/96.16, 96.15; 370/1, 3

[56] References Cited

U.S. PATENT DOCUMENTS 4,834,481  3/1989  Lawson et al. ............. 350/96.16 X
4,955,014  9/1990  Kuppers et al. .................... 370/1 X

OTHER PUBLICATIONS

"Highly Selective Evanescent Modal Filter for Two-- Mode Optical Fibers," Optics Letters, Sep. 1986, vol. 11, No. 9, pp. 581-583.

Primary Examiner—John D. Lee
Assistant Examiner—Stephen W. Barns
Attorney, Agent, or Firm—Christie, Parker & Hale

[57] ABSTRACT

For an optical communications system for diplex or duplex transmission, especially for the subscriber area, a new multiplexing process, namely, the combination of fiber mode multiplexing and wavelength multiplexing, is reported, i.e., the two signals to be transmitted are transmitted with different fiber modes ($LP_{01}$, ($LP_{11}$) and with different wavelengths ($\lambda_1$, $\lambda_2$) unidirectionally or bidirectionally via a single waveguide. Fusion couplers with exactly similar fibers (FIG. 3) are used as system components such as multiplexers, demultiplexers, and duplexers when one of the two wavelengths is above and one is below the cutoff wavelength of the coupler waveguide and the transmission waveguide (104, 114); or fusion couplers (21, 31) with dissimilar fibers are used when both wavelengths are below the cutoff wavelength.

15 Claims, 4 Drawing Sheets

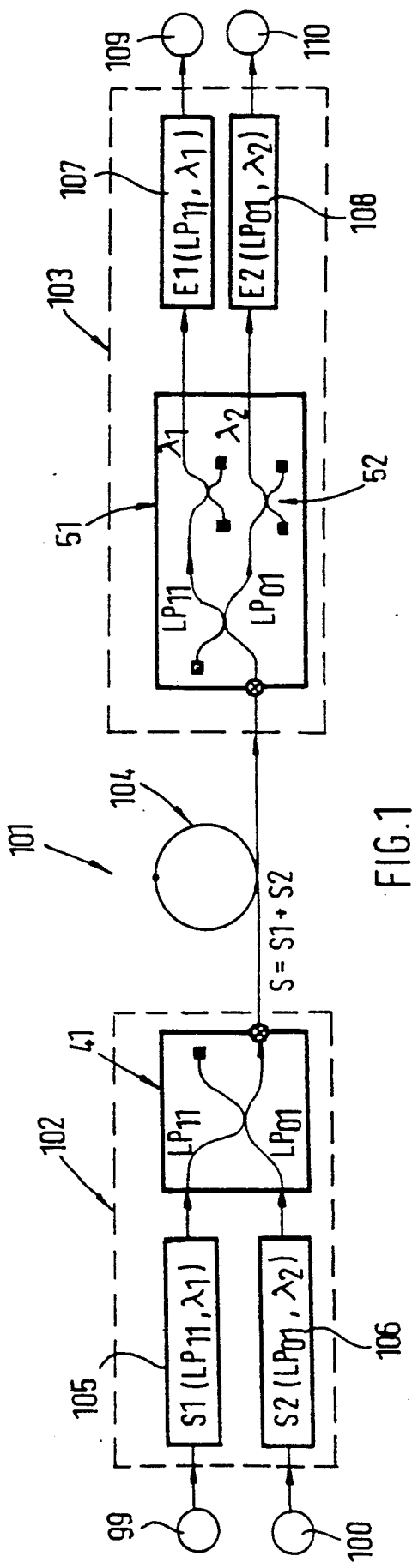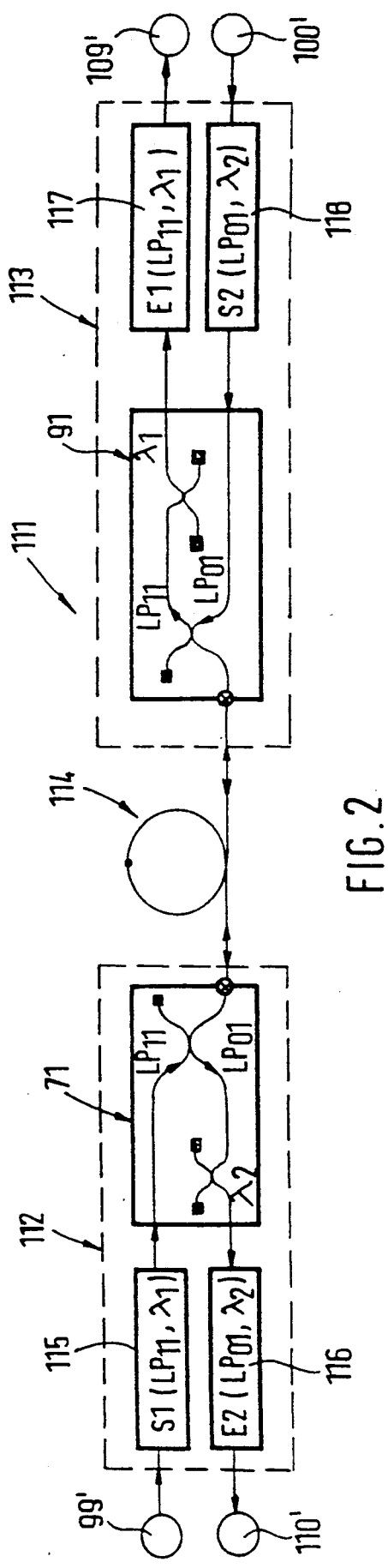

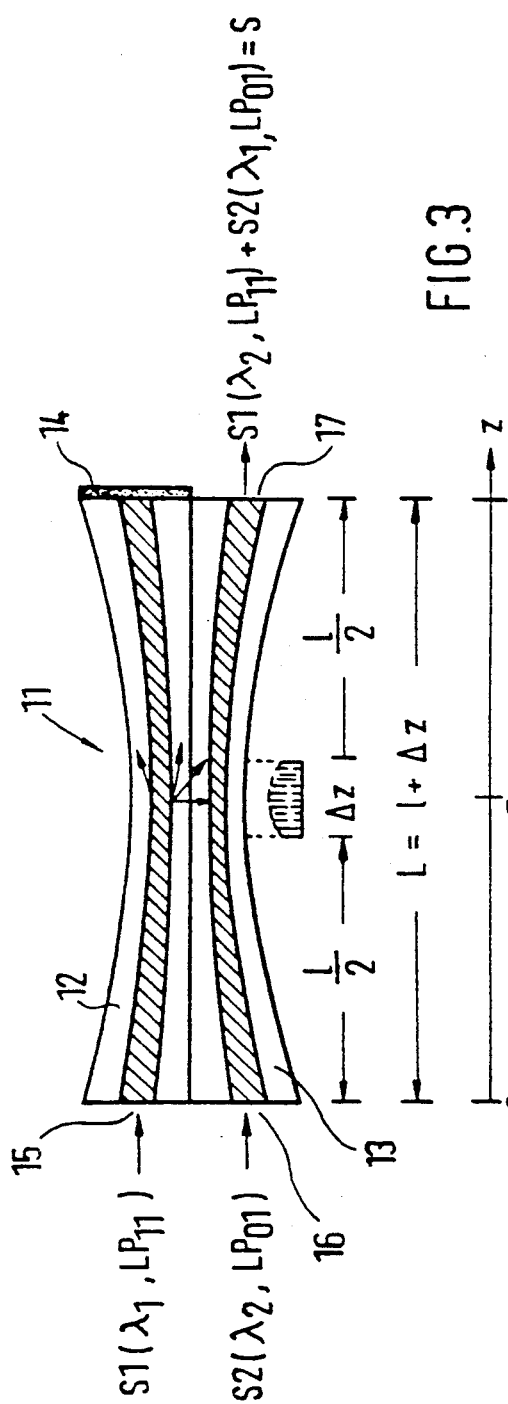
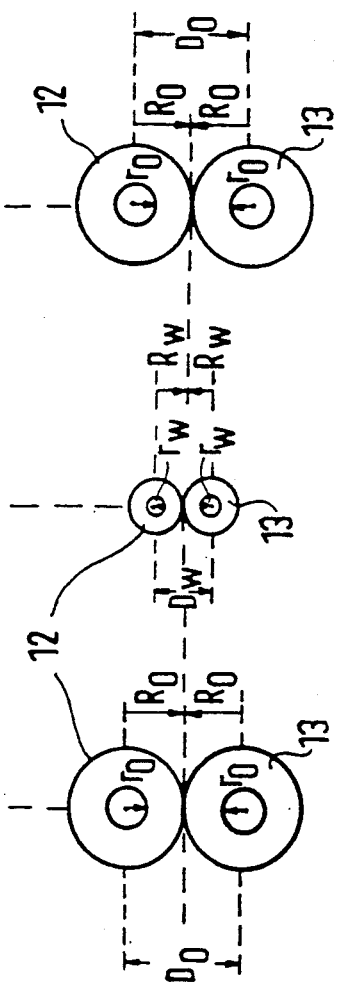

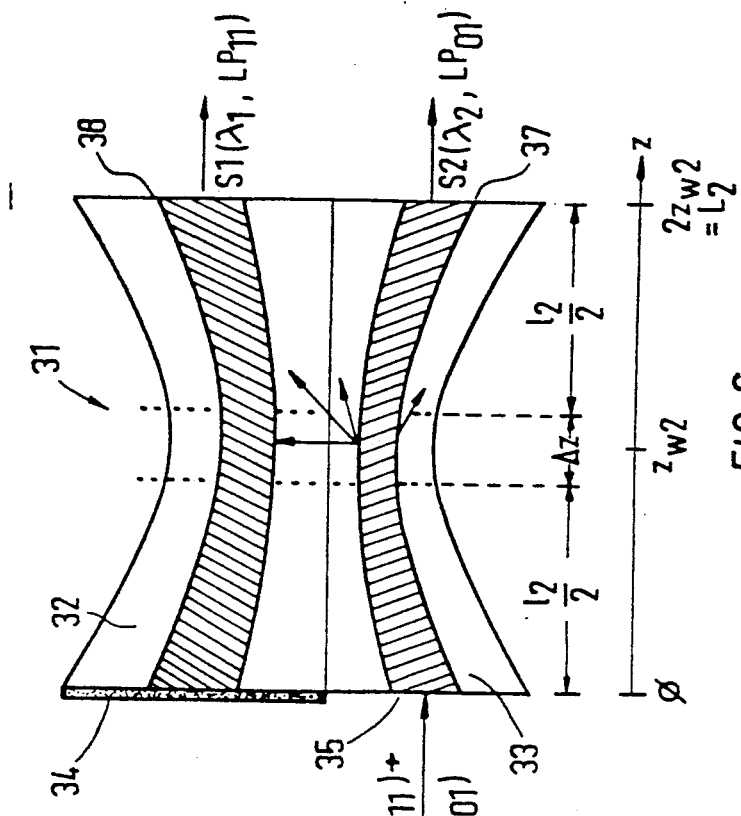
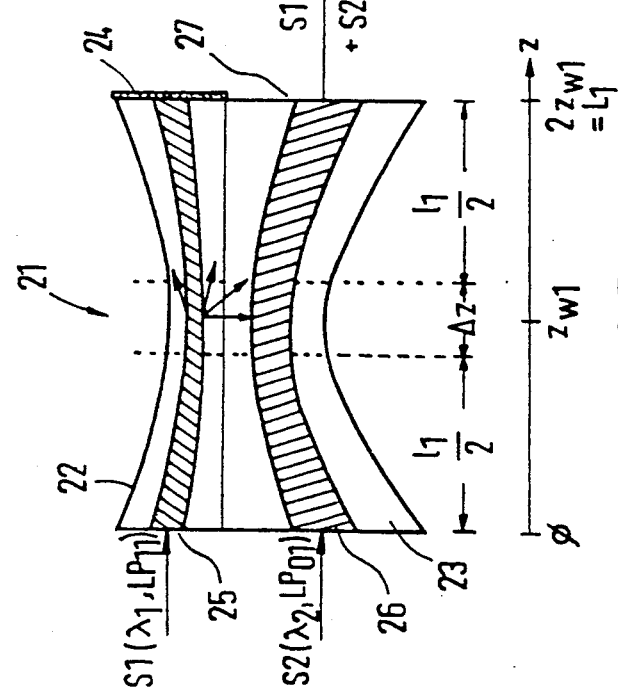
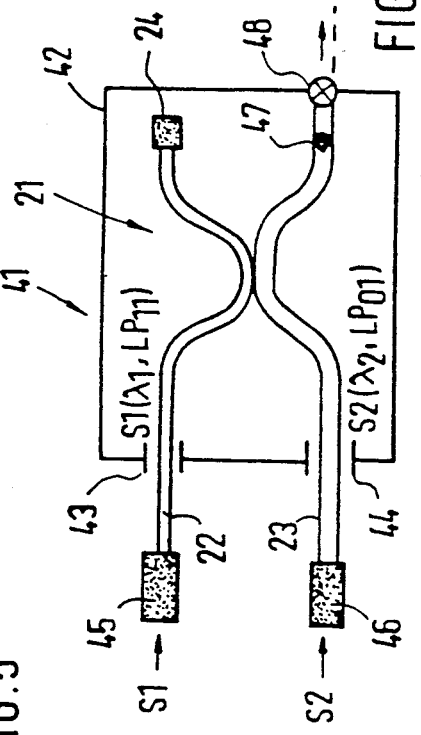
FIG.5
FIG.6
FIG.7

OPTICAL COMMUNICATIONS SYSTEM FOR DIPLEX OR DUPLEX TRANSMISSION

TECHNICAL FIELD

The invention concerns an optical communications system.

BACKGROUND ART

Reference is made to commonly assigned published European patent EP-A-O 265,918 and to the corresponding copending U.S. Pat. No. 4,955,014 filed on 30 Oct. 1987 in the name of D. Küppers et al. In the referenced patent documents, an embodiment of a diplex transmission system, i.e. a multiplex system for transmission of two signals unidirectionally via a single waveguide, is illustrated in FIG. 5. In that embodiment, both signals are transmitted with the same wavelength, but with different waveguide modes, so that the transmission process can be described as a waveguide mode multiplex process. The two optical signals to be transmitted in the different modes are coupled in the waveguide, using a monomode fiber-fusion coupler which is fabricated from two exactly similar monomode fibers, i.e., the multiplexer is a waveguide fusion coupler.

In the following, the simpler expression "fiber" is used instead of the expression "waveguide" from time to time.

With the two exemplary embodiments of FIG. 3 and FIG. 4, respectively, the referenced patent document discloses an optical duplex communications system, i.e., a bidirectional optical communications system for two optical signals. The embodiment according to FIG. 3 deals with a wavelength multiplex system in which both signals are transmitted in the same waveguide mode, i.e., the fundamental mode; and the embodiment according to FIG. 4 deals with a waveguide mode multiplex system in which both signals have the same wavelength. Wavelength-selective waveguide fusion couplers are provided as duplexers to separate the two wavelengths in the embodiment according to FIG. 3. Mode filters (MF2, MF1) are provided as duplexers to separate the two different modes in the embodiment according to FIG. 4; and also in the diplex transmission system according to FIG. 5, a suitable mode filter (MF) is present on the reception side to separate the two modes. Concerning these mode filters, it is stated that in the simplest case they are "tapered" standard monomode waveguides as in FIG. 6 or that they may also be couplers such as are disclosed in another literature citation. However, the couplers disclosed in that citation are not "fusion" couplers, but rather "mechanically polished" couplers.

The principle that the transmission wavelengths are clearly below the cutoff frequency of the waveguide is common to all the examples mentioned. The multiplexers, demultiplexers, or duplexers are in all cases designed to separate the optical signals from each other on the basis of a single characteristic, either on the basis of their wavelength or on the basis of the waveguide mode in which they are propagate via the waveguide, or, in the case of the multiplexer, to combine them into a multiplexed signal.

In each case, the objective is to achieve the most efficient coupling or decoupling when combining or separating the two optical signals. It can be difficult to produce such couplers with the required efficiency, for example, when the two wavelengths are close together when wavelength multiplexing is used.

DISCLOSURE OF INVENTION

Therefore, the purpose of the invention is to provide a diplex or duplex transmission system for transmission of two optical signals, which differs from the systems known from the publication mentioned above in terms of wavelength and modes and in terms of the multiplexers, demultiplexers, or duplexers used.

In a first solution, in which both wavelengths are below the cutoff wavelength of the waveguide and fusion couplers with dissimilar fibers, are used as multiplexers, demultiplexers, and duplexers. In a second solution, only one of the two wavelengths is below the cutoff wavelength of the waveguide and in which the multiplexers, demultiplexers, and duplexers are fusion couplers which are fabricated from exactly similar fibers.

Both solutions have the advantage that the couplers are system components which are simple and cost-effective to produce relative to their coupling efficiency so that the systems are cost-effective and have good optical characteristics.

BRIEF DESCRIPTION OF DRAWINGS

The invention will now be explained through examples with the help of the drawings.

The drawings present:

FIG. 1 a schematic representation of an optical diplex communications system according to the invention, FIG. 2 a schematic representation of an optical duplex communications system according to the invention, FIG. 3 a schematic representation of a longitudinal section through a known monomode fiber-fusion coupler with exactly similar fibers in a new mode of operation suitable for a system according to the invention, FIGS. 4 A, B, C the respective cross-sections of the monomode fibers in different longitudinal sections of the coupler according to FIG. 3, FIG. 5 a schematic representation of a longitudinal section through a monomode fiber-fusion coupler of a first variant with dissimilar fibers for an optical communications system according to the invention, FIG. 6 a schematic representation of a longitudinal section through a monomode fiber-fusion coupler of a second variant with dissimilar fibers for an optical communications system according to the invention, FIG. 7 a schematic representation of a multiplexer using a monomode fiber-fusion coupler according to FIG. 5 for an optical communications system according to the invention, FIG. 8 a schematic representation of a demultiplexer using a monomode fiber-fusion coupler according to FIG. 6 for an optical communications system according to the invention, FIG. 9 a schematic representation of a duplexer using a coupler according to FIG. 5 for one end of a duplex communications system according to the invention, and FIG. 10 a schematic representation of a duplexer using a coupler according to FIG. 6 for the other end of a duplex communications system according to the invention.

BEST MODE FOR CARRYING OUT THE INVENTION

Figure 8:
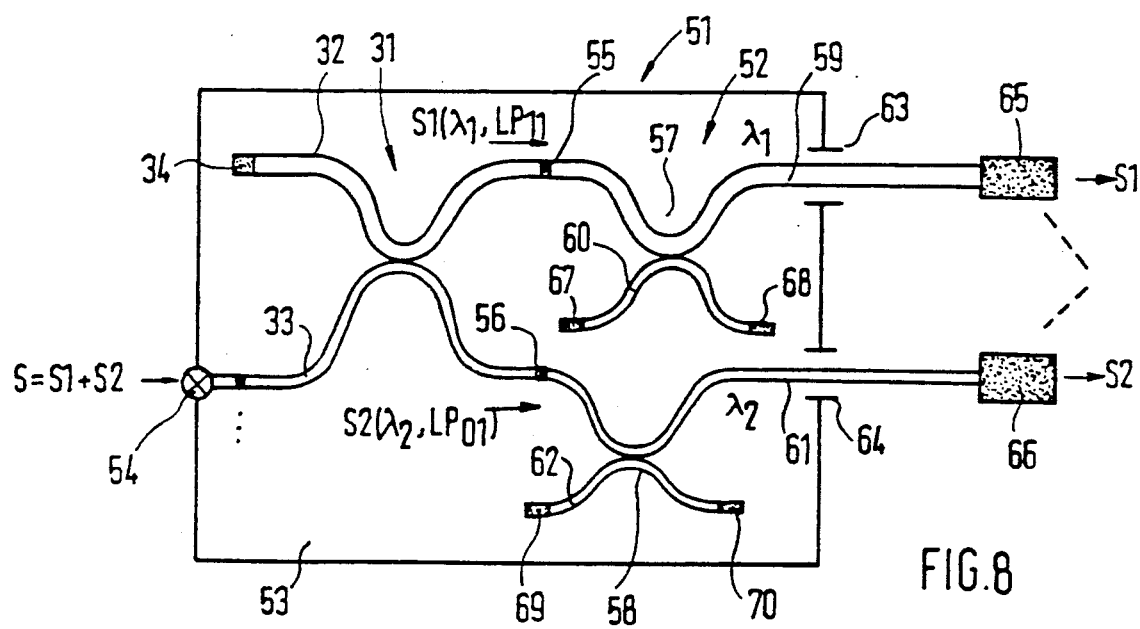

FIG. 1 shows a unidirectional optical communications system 101, in which two optical signals are transmitted in the same direction via a single waveguide. Such a transmission system is referred to as a diplex transmission system.

In this system, a transmission point 102 is connected via a waveguide 104, with a length on the order of 5 km, to a terminal point 103. This transmission point can be a "head" station and the receiving point can be a subscriber station of a communications system for the subscriber area. An optical signal S1 with a wavelength of $\lambda_1$ arrives at the transmission point 102 from a first transmitter 99, and a second optical signal S2 with a wavelength of $\lambda_2$ arrives from a second transmitter 100. By means which are not shown, provisions are made to transmit the optical signal S2 in the fundamental waveguide mode $LP_{01}$ and the optical signal S1 in the next higher mode above the fundamental waveguide mode $LP_{11}$. The presence of these signals S1 and S2 with different wavelengths and different modes is represented in FIG. 1 by blocks 105 and 106.

The transmission point 102 has a multiplexer 41 which is explained in greater detail with the help of FIGS. 3, 5, and 7. It combines the two optical signals S1 and S2 into a multiplexed signal and feeds this into the waveguide 104 which forms the transmission line which transmits it to the receiving point 103. This receiving point 103 has a demultiplexer which is explained in greater detail with the help of FIGS. 6 and 8. The demultiplexer separates the two optical signals transmitted S1 and S2 from each other and conveys two reception signals E1 and E2 corresponding to the signals S1 and S2 to its outputs. Signal E1 has the wavelength $\lambda_1$ and the higher waveguide mode $LP_{11}$, whereas the signal S2 has the wavelength $\lambda_2$ and the fundamental waveguide mode $LP_{01}$, which fact is represented by blocks 107 and 108. These signals E1 and E2 are fed (by means not shown) to optical receivers 109 and 110. Their content can, for example, consist of television programs and stereo radio programs, which are transmitted to the subscribers in an optical cable television distribution system. Explanations concerning the type of the multiplexer 41, the type of the demultiplexer 51, and the position of the wavelengths $\lambda_1$ and $\lambda_2$ are provided below.

FIG. 2 shows a bidirectional optical communications system 111, in which two optical signals are transmitted in opposite directions via a single waveguide 114. Such a system is called a duplex transmission system.

This system 111 has a transmit-receive-station 112, which may be found, for example, at a relay station, and a transmit-receive-station 113, which may be found, for example, at a subscriber site. The two stations are linked to each other via a waveguide 114 with a length on the order of 5 km. This optical communications system is used, for example, for interactive signal transmission in a narrowband or broadband ISDN.

The distribution-side transmit-receive-station 112 and the subscriber-side transmit-receive-station 113 are each equipped with an optical transmitter 99' or 100' and an optical receiver 110' or 109'. The optical transmitter 99' and other means not shown assure that the transmit-receive-station 112 sends out a transmission signal S1 with a wavelength $\lambda_1$ and that this is transmitted in the higher waveguide mode $LP_{11}$. In the other transmit-receive-station 113, the optical transmitter 100' and other means not shown assure that a transmission signal S2 with a wavelength $\lambda_2$ is transmitted over the transmission line in the fundamental waveguide mode $LP_{01}$. The presence of this transmission signal is represented in the station 112 by a block 115 and in the station 113 by a block 118.

From the transmission signal S1 transmitted from the station 112 to the station 113, a reception signal E1 is generated with the same mode and the same wavelength, Which is represented there by a block 117, and from the transmission signal S2 transmitted from the station 113 to the station 112, a reception signal is generated with the same wavelength $\lambda_2$ and the fundamental mode $LP_{01}$, which is represented there by a block 116.

Figure 9:
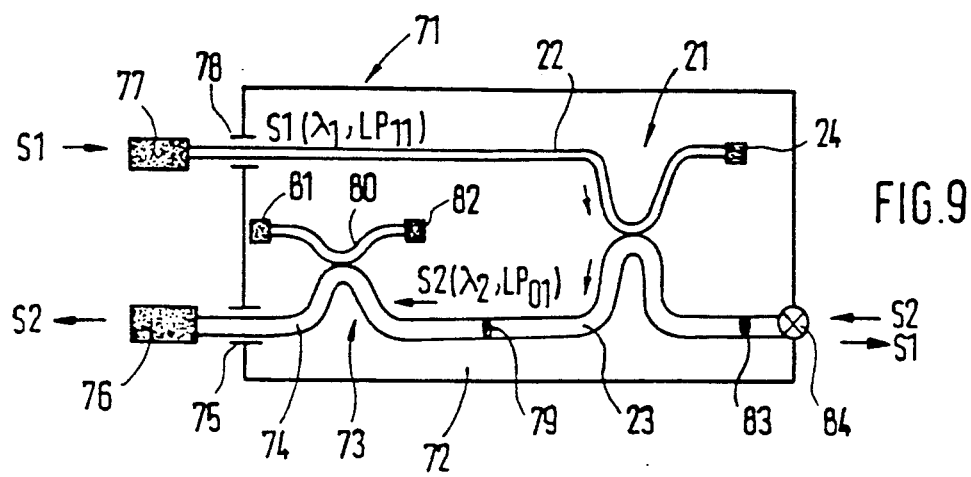

The distribution-side transmit-receive-station 112 includes a duplexer 71, which is shown in FIG. 9 and is explained later. On one side (transmitter-receiver, side), the transmission signal S1 from block 115 is input to the duplexer 71 through a first connection, and another connection outputs the reception signal E2 in the direction of the optical receiver 110'. On its other side (transmission line side), it is linked to the waveguide 114.

Figure 10:
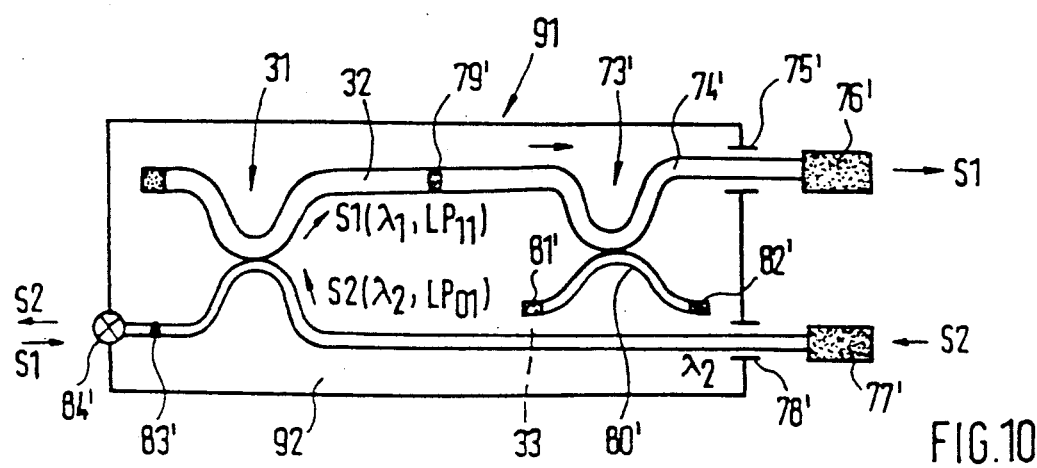

The subscriber-side station 113 has a duplexer 91, which is shown in FIG. 10 and is explained later. This duplexer 91 has a transmitter-receiver side with a first connection, into which the transmission signal S2 is input from block 118, and with a second connection, on which it outputs the reception signal E1, and a transmission line side with a connection linked to the waveguide 114.

The two systems according to FIG. 1 and FIG. 2 have in common that the different signals are differentiated by the mode in which they are transmitted via the waveguide and by their wavelength. Thus, the system according to FIG. 1 is a mode-wavelength-diplex transmission system and the system according to FIG. 2 is a mode-wavelength-duplex transmission system, with modes referring to the light propagation modes in the waveguide.

With regard to the wavelengths and the structure of the system components used such as multiplexers, demultiplexers (in FIG. 1) and duplexers (in FIG. 2), there are, according to the invention, two alternatives for both the diplex system according to FIG. 1 and the duplex system according to FIG. 2.

In the first alternative, the components such as multiplexers, demultiplexers, and duplexers, referred to in the following simply as couplers, are fiber-fusion couplers in which the fibers from which they are fabricated by fusion are exactly similar fibers.

The wavelength $\lambda_2$, i.e., that of the signal transmitted in the fundamental mode, is in this alternative above the cutoff wavelength $\lambda_c$ of the waveguide, and the wavelength $\lambda_1$ of the signal transmitted in the higher mode is below the cutoff wavelength.

In the second alternative, the couplers used each consist of dissimilar fibers, such that each coupler includes a standard monomode fiber provided to carry the signal transmitted in the fundamental mode and a fiber which is thinner or thicker than the standard monomode fiber provided to carry the next higher mode $LP_{11}$. Whether this second fiber is thinner or thicker than the standard monomode fiber depends on whether, in the coupler in question, it serves to couple the light to be transmitted in the higher mode into the other fiber or to decouple it out of the standard monomode fiber. In both cases, such couplers are used in such a way that their standard monomode fiber is linked on the one hand to the transmission waveguide (104 or 114) and on the other hand to the transmitter or the receiver from which or to which an optical signal is transmitted in the fundamental fiber mode $LP_{01}$. In this alternative, the wavelengths $\lambda_1$ and $\lambda_2$ of the signals transmitted are both below the cutoff wavelength $\lambda_c$ of the transmission waveguide 104 or 114.

Now, with the help of FIGS. 3 through 10, the two alternatives of the couplers to be used as multiplexers, demultiplexers, and duplexers are explained in detail.

FIG. 3 shows a known monomode fiber-fusion coupler 11, fabricated from two exactly similar fibers 12 and 13. The mode of operation represented here as mode and wavelength multiplexers is a new mode of operation suitable for the new system according to claim 1. The fibers 12 and 13 used in its fabrication are two exactly similar standard monomode fibers with the following characteristics:

| Fiber core radius: | $r_o$ = 4.35 microns |
|---|---|
| Fiber mantle radius: | $R_o$ = 62.5 microns |
| Refractive index difference: | $\Delta_n$ = 3 × 10$^{-3}$ |
| Cutoff wavelength: | $\lambda_c$ = 1270 nm |
| $\lambda_o$ (least dispersion): | $\lambda_o$ = (1310 ± 15) nm |

The symbols used in FIGS. 3 and 4 represent the following:

$\Delta z$ = Length of the fusion flame
$l$ = Coupler drawing length excluding flame length
= L Coupler length (L = l + $\Delta z$) = fusion length
$r_o$ = Radius of the fiber core before drawing
$R_o$ = Radius of the fiber mantle before drawing
$D_o$ = Distance of the fiber core before drawing
$r_w$ = Radius of the fiber core in the center of the coupler
$R_w$ = Radius of the fiber mantle in the center of the coupler at $Z_w$
$D_w$ = Distance of the fiber core in the center of the coupler at $Z_w$
$Z_w$ = Length of the coupler up to the center of the coupler $$Z_w = \frac{L}{2} = \frac{1 + \Delta z}{2}$$

The two fibers 12 and 13 are drawn during fabrication of the fusion coupler 11 in such a way that they are tapered from their respective ends down to the center, both in core diameter and in mantle diameter, as can be seen in the partial FIGS. 4. In this so-called "tapering" of the standard monomode fibers 12 and 13, their size is reduced from the normal core radius $r_o$ to a core radius of $r_w$ of approximately 1 micron. One of the two fibers of the fusion coupler 11, the fiber 12 shown at the top of the drawing, has a nondissipative termination 14 at one of its ends.

The use of such a fusion coupler as the multiplexer 41 of FIG. 1 will no be described. An optical signal S1, whose wavelength is below the cutoff wavelength $\lambda_c$ of the waveguide used as the transmission line, for example, 788 nm, is fed into one end 15 of the fiber 12. This signal S1 is transmitted in the next higher fiber mode $LP_{11}$ above the fundamental fiber mode $LP_{01}$ and is already in this mode when fed into the coupler end 15. A second optical signal S2, with a wavelength $\lambda_2$ above the cutoff wavelength $\lambda_c$ of waveguide of the transmission line, for example, 1300 nm, is fed into an end 16 of the other fiber 13 located on the same side of the coupler 11. This signal S2 is fed into the coupler 11 in the fundamental fiber mode $LP_{01}$ and transmitted via the transmission line in that same mode.

The cutoff wavelength $\lambda_c$ of the waveguide of the transmission line is the same as that of the standard monomode fibers 12 and 13, since the transmission line waveguide is also such a standard monomode fiber. The monomode fiber-fusion coupler 11 has the characteristic that a multiplexed signal S = S1 + S2 appears at the end 17 of the fiber 13. This characteristic is obtained as follows:

By means of the above-mentioned "tapering" of the standard monomode fibers 12 and 13 to a core radius $r_w$ of approximately 1 micron, the normalized frequency of the fiber core is reduced so that the optical signal originally propagated in the $LP_{11}$ fiber mode cannot be propagated in the core of the fiber 12, but enters the fiber mantle and from there is coupled over to the fiber mantle of the other fiber 13. In this process, this $LP_{11}$ signal enters the core of that other fiber 13 and is propagated therein, since with the increasing fiber core diameter the normalized frequency of the core of the fiber 13 rises again. This makes the monomode fiber-fusion coupler 11 mode selective because the signal with the next higher fiber mode $LP_{11}$ above the fundamental fiber mode $LP_{01}$ couples over into the core of the other fiber 13, while the fundamental fiber mode $LP_{01}$ is retained in the fiber 12 into which it was originally coupled. The basis for calculations, particularly, when the "tapering" progresses exponentially, is found in an article by J. Bures et al. in "APPLIED OPTICS", Vol. 22, No. 12, June 1983, pp. 1918-1922.

Since the so-called V-number of the fiber core depends on the wavelength, $r_w$, $D_w$, l, L, and $Z_w$ are also wavelength dependent. The normalized frequency $V_w$ of the fiber core always reaches exactly the normalized cutoff wavelength of the coupler for the next higher fiber mode at the point $Z_w$. Mode selective fusion couplers 11 with exactly similar monomode fiber 12 and 13, regardless of whether they are provided for unidirectional operation as shown in FIG. 3 or for bidirectional operation, must therefore be designed for the wavelength $\lambda_1$ of the optical signals transmitted in the higher fiber mode $LP_{11}$. Otherwise, it would no longer be guaranteed that the coupling over of the signal transmitted in the higher fiber mode $LP_{11}$ would occur in the $\Delta z$ region. Coupling over outside this region would lead to excessively high and, therefore, inadmissible losses in the $LP_{11}$ signal since no coupling over or only weak coupling over would occur.

According to the invention, the monomode fiber-fusion coupler 11 with exactly similar standard monomode fibers 12 and 13 shown in FIGS. 3 and 4 is operated with different wavelengths in such a way that the wavelength $\lambda_1$ of the optical signal transmitted in the higher mode is clearly below the cutoff wavelength $\lambda_c$ and the wavelength $\lambda_2$ of the optical signal transmitted in the fundamental mode is above the cutoff wavelength $\lambda_c$.

This coupler can also be operated in the opposite direction in such a way that a multiplexed signal S containing both signals S1 and S2 is fed into the coupler 11 at point 17 and both signals S1 and S2 are output at the fiber ends 15 and 16 of the coupler 11. In this case the coupler output shown in FIG. 3 is used as a coupler input and the coupler inputs 15 and 16 are used as coupler outputs. The latter mode of operation of the coupler is that of the demultiplexer, which is shown in FIG. 1 as demultiplexer 51.

In an additional mode of operation of the fusion coupler 11, the signal S1 is coupled into the fiber end 15 and output at the fiber end 17. The signal S2 is fed into this fiber end 17 from the opposite direction and output at the fiber end 16, with S1 and S2 having the modes and wavelengths reported in FIG. 3 or FIG. 2. This is the mode of operation in which the coupler is used as the duplexer 71 of the system according to FIG. 2.

In an additional mode of operation, the coupler 11 can be used in such a way that the signal S2 input into the fiber end 16 and output at the fiber end 17 and that the signal S1 input into the fiber end 17 from the opposite direction and output at the fiber end 15. In this mode of operation, the coupler may be used as the duplexer 91 of the system according to FIG. 2. In each case, the coupler has the characteristic that the signal coupled into a fiber in the fundamental mode is forwarded in this fiber, whereas the signal coupled-in in the higher mode is coupled over into the other fiber.

The principle of the coupler with dissimilar fibers to be used in connection with the second alternative corresponding to FIG. 1 and FIG. 2 is now explained with the help of FIG. 5 and FIG. 6. FIG. 5 shows a monomode fiber-fusion coupler 21, fabricated from dissimilar monomode fibers 22 and 23; and FIG. 6 shows a monomode fiber-fusion coupler 31, fabricated from dissimilar monomode fibers 32 and 33. The meaning of the measurements presented there can be found in the legend to FIG. 3. In a monomode fiber-fusion coupler 21, the fiber 23 is a standard monomode fiber with the following specifications, for example:

$r_o = 4.35$ microns $R_\sigma = 62.5$ microns $\Delta_n = 10^{-3} \lambda_c = 1270$ nm, whereas the monomode fiber 22 is a monomode fiber with a thinner core and mantle diameter. The two fibers 22 and 23 are subjected, as in the embodiment according to FIG. 3, to a "tapering" process, i.e., they are tapered, preferably exponentially, from both ends toward the center.

The use of coupler 21 in one mode of operation as a fiber mode multiplexer will now be described.

A signal S1 with a wavelength $\lambda_1$ is fed into the thinner monomode fiber 22 at one end 25 in the next higher fiber mode $LP_{11}$ above the fundamental fiber mode $LP_{01}$. The other end of this fiber 22 is provided with a nondissipative termination 24. A signal S2, with a wavelength $\lambda_2$, is fed into the second fiber 23 of the coupler 21 at the fiber end 26 of the standard monomode fiber 23, from the same side on which the coupler 21 has the fiber end 25, and transmitted in the fundamental fiber mode $LP_{01}$. In the embodiment example, the wavelength $\lambda_1$ of signal S1 is 788 nm and the wavelength $\lambda_2$ of the second signal S2 is 830 nm so that both wavelengths are clearly below the cutoff wavelength $\lambda_c$ of 1270 nm, for example, of the standard waveguide.

Again in this coupler 21, the signal S1 transmitted in the next higher fiber mode $LP_{11}$ is coupled over from the fiber 22, into which it is coupled, into the other fiber 23 so that a multiplexed signal resulting from the addition of the two signals S1 and S2 is sent out at the end 27 of the fiber 23 since the signal S2 transmitted in the fundamental fiber mode $LP_{01}$ passes unhindered through the standard monomode fiber 23. In the coupler 21, the signal transmitted in the higher mode $LP_{11}$ is coupled over from the thinner fiber 22 into the standard monomode fiber 23 and this occurs primarily in the $\Delta z$ region of the coupler.

Like the coupler according to FIG. 5, the monomode fiber-fusion coupler 31 according to FIG. 6 includes a standard monomode fiber, labeled 33 (and shown at the bottom). Its specifications are identical to those of the standard monomode fiber 23 used in FIG. 5. The fusion coupler 31 has as a second fiber a monomode fiber 32 with a thicker core and mantle diameter, which has a nondissipative termination 34 at one end, shown as the left end in FIG. 6. The two fibers 33 and 32 are, like the fibers 22 and 23 of the coupler 21 according to FIG. 5, subjected to a tapering process. If a multiplexed signal $S = S1 + S2$ composed of the signals labeled S1 and S2 in FIG. 5 is now fed into one end 35 of the standard monomode fiber 33 located on the same side of the coupler 31 as the nondissipative termination 34 of the other fiber 32, the part S1 of the multiplexed signal S is coupled over into the thicker fiber 32 primarily in the $\Delta z$ region of the fusion coupler 31 and transmitted with the wavelength $\lambda_1$ in the next higher mode $LP_{11}$, while the signal S2, which is transmitted with the wavelength $\lambda_2$ in the fundamental fiber mode $LP_{01}$, passes unhindered through the standard monomode fiber 33, so that the signal S2 appears in the fundamental mode at the fiber end 37 of the standard monomode fiber and the signal S1 transmitted in the higher mode $LP_{11}$ appears at the end 38 of the thicker fiber 32.

In the mode of operation described above, the fusion coupler 21 may be used as the multiplexer 41 of the diplex transmission system according to FIG. 1, whereas the coupler 31 may be used as the demultiplexer 51 of the same system. As mentioned in connection with FIG. 1, it is common to both systems that they consist of two dissimilar fibers, and the system according to FIG. 1 has the characteristic that both wavelengths are clearly below the cutoff wavelength of the standard monomode fibers (of the coupler and of the transmission line).

In the case of the coupler 21, in which the light transmitted in the higher mode is supposed to be coupled over from one fiber into the standard monomode fiber, this is a fiber which is thinner than the standard monomode fiber; and in the case of the coupler 31, in which light from standard monomode fiber is supposed to be coupled over into the other fiber, this other fiber is thicker than the standard monomode fiber.

In the two fusion couplers 21 and 31, the core and mantle diameters of the fibers 22, 23 or 32, 33 are selected proportionally to the relationship between the light wavelengths $\lambda_1 / \lambda_2$. In the case of the coupler 31, the signal S1 in the thinner fiber 22 and the signal S2 in the standard monomode fiber 23 yield the same $V_o$ and $V_w$ numbers; and $z_w$, l, L of the coupler 21, just as with the coupler 31, have identical values for the two light wavelengths $\lambda_1$, $\lambda_2$. The signal S1 in the thinner fiber 22 and the signal S2 in the standard monomode fiber 23 of the coupler 21 are coupled over according to the same coupler lengths $z_w$ in the $\Delta z$ region. For example, signals S2 converted into the next higher fiber mode $LP_{11}$ in poor plug connections or at splices, which leave the core of the standard fiber in the fusion coupler 21, are propagated forward in the thinner fiber 22 and annihilated in the nondissipative termination 24. It would also be possible, for example, to use a wavelength $\lambda_2$ for the second signal S2 in the region of the cutoff wavelength $\lambda_c$, e.g., 1200; however, the coupling over would then take place at the end of the $\Delta z$ region or just outside it, which would lead to a high optical loss in the respective $LP_{11}$ signal. The same may be accomplished for the fiber coupler 31 according to FIG. 6.

FIG. 7 shows a practical implementation of a fiber mode multiplexer of the system according to FIG. 1 using a fusion coupler 21 according to FIG. 5. The fusion coupler 21 is placed inside a box 42 out of which the two fibers 22 and 23 come through conduits 43, 44 and terminate in an optical plug 45, 46 for connection to the optical transmitter. The two signals S1 ($\lambda_1$, $LP_{11}$) and S2 ($\lambda_2$, $LP_{01}$) are fed into the fiber mode multiplexer via the optical plugs. The multiplexed signal S=S1 +S2 is propagated out of the fiber multiplexer 41 to the transmission waveguide via a splice 47 and an optical plug connection 48.

FIG. 8 shows the practical implementation of a fiber mode demultiplexer 51 for the system according to FIG. 1 using a fusion coupler 31 according to FIG. 6. The fusion coupler 31 is, like the other parts of the demultiplexer 51 which remain to be described, placed inside a box 53 and provided on the input side with an optical plug connection 54 to which the multiplexed signal S is conveyed. Both the output of the fusion coupler 31 carrying the signal S1 and the output of the fusion coupler 31 carrying the signal S2 are optically connected via a splice 55 or 56 with a wavelength-selective demultiplexer 57 or 58, one branch 59 or 61 of which comes out from the box 53 via a conduit 63 or 64 and is connected to an optical plug 60 or 66. The signals S1 and S2 coming out at the optical plugs are respectively forwarded to a receiver by a means not shown.

The respective second branch 60 or 62 of the wavelength-selective demultiplexer 57 or 58 is provided on both ends with a nondissipative coupler termination 67 to 70. The wavelength-selective demultiplexers 57 or 58 are used for optical refiltering and are supposed to compensate for the optical far-end crosstalk attenuation of the signals.

The wavelength-selective demultiplexers 57 or 58 are also used to collect and annihilate possible stray light occurring at plug connections and/or splices. Such stray light could, for example, result from the fact that a part of the signal S is converted into the next higher fiber mode $LP_{11}$ from the fundamental fiber mode $LP_{01}$ or from the fact that a part of the signal S1 is converted into the fundamental fiber mode $LP_{01}$ from the next higher fiber mode $LP_{11}$.

Instead of the fused fiber couplers shown here for production of the wavelength-selective demultiplexers 57 and 58, conventional components, such as other types of wavelength-selective couplers or dichroic interference filters or diffraction grates, for example, could be provided.

The wavelength-selective demultiplexers could even be omitted, although they are shown in FIG. 1 as components of the demultiplexer 51, if the problems of stray light described above are not present.

FIG. 9 shows a fiber mode duplexer 71 of the duplex system according to FIG. 2 in which a fiber coupler 21 according to FIG. 5 is used. Besides the fusion coupler 21, the fiber mode duplexer 71 contains, inside a box 72, a wavelength-selective demultiplexer 73, whose continuous first branch 74 comes out of the box via a conduit 75 and is connected to an optical plug 76, which is connected by means not shown to a waveguide leading to a receiver. Another optical plug 77, which is connected by means not shown to a waveguide coming from a transmitter, is connected to the thinner fiber 22 of the fusion coupler 21, and this fiber 22 runs through a conduit 78 in the box 72. The standard fiber 23 of the fusion coupler 21 is linked to the other end of the first branch 74 of the wavelength-selective demultiplexer 73 via a splice 79. The second branch 80 of the demultiplexer 73 is provided at both ends with a nondissipative termination 81 or 82.

The other end of the fiber 23 of the fusion coupler 21, which is on the same side of the fusion coupler as the nondissipative termination 24 of the fiber 22, is connected to a remote transmission-reception station by a splice 83 and an optical coupling 84 by means not shown via the transmission waveguide.

In this embodiment, in which the fusion coupler 21 is used in a duplex mode of operation, the signal S1 transmitted with the wavelength $\lambda_1$ in the next higher fiber mode $LP_{11}$ from a transmitter is first coupled in the fusion coupler 21 into the thinner fiber 22 and coupled over from there into the standard monomode fiber 23, which forwards it to the waveguide leading to the remote transmission-reception station. In the opposite direction, the signal S2 coming from there with the wavelength $\lambda_1$ in the fundamental fiber mode $LP_{01}$ is coupled into the standard monomode fiber 23 and remains in it, passes through the wavelength-selective demultiplexer 23, if this is present, and arrives at the receiver, which is not shown.

Thus, the light transmitted in the fundamental fiber mode is coupled into the standard monomode fiber and forwarded in it, and the light to be transmitted in the higher mode is coupled into the thinner fiber and coupled over from there into the standard monomode fiber.

FIG. 10 shows a duplexer 91 provided for the other end of the duplex transmission system shown in FIG. 2. This duplexer 91 contains, within a box 92, a fusion coupler 31, as shown in FIG. 6, and, if necessary or desirable, a wavelength-selective demultiplexer 73' whose first branch 74' comes out of the box 92 via a conduit 75' and is connected to an optical plug 76', which is linked by means not shown to a waveguide leading to a receiver. A second optical plug 77', which is connected by means not shown to a waveguide coming from a transmitter, is connected to the standard monomode fiber 33, which goes into the box 92 via a conduit 78'. The wavelength-selective demultiplexer 73', whose second branch 80' is provided with nondissipative terminations 81' or 82' on both ends, is connected to the other end of its first branch 74' by a splice 79' with the thicker fiber 32' of the fusion coupler 31. The other end of the standard monomode fiber 33 of the fusion coupler 31 is linked via a splice 83' and an optical plug connection 84' with the transmission waveguide, not shown, which leads to a remote transmission-reception station.

In this mode of operation of the fusion coupler 31, in which it is used as a duplexer, a signal S2 is propagated (as with the duplexer according to FIG. 9) in the fundamental mode and with a wavelength $\lambda_2$ in the standard monomode fiber, so that with the waveguide forming the transmission line in this duplexer (as in that shown in FIG. 9) the connection of the coupler, at which the light propagated in the fundamental mode exits, is linked to the transmission waveguide. The signal S1 transmitted from the remote transmission-reception station in the higher mode with the wavelength $\lambda_1$, which the duplexer has decoupled out of the standard monomode fiber 33, arrives at this coupler connection.

This occurs with the help of the second fiber 32, which is thicker than the standard monomode fiber.

In a duplexer with two dissimilar fibers wherein the first of these two dissimilar fibers is a standard monomode fiber, the second fiber is thus a thinner fiber, when the purpose of the duplexer is to couple the signal transmitted in the higher mode into the standard monomode fiber (FIG. 9), and the second fiber is a thicker fiber, when the purpose of the duplexer is to decouple the signal transmitted in the higher mode out of the standard monomode fiber (FIG. 10).

It should be mentioned that all types of the above-described couplers, even without the additional wavelength-selective demultiplexers, have significant wavelength selectivity in addition to their mode selectivity.

I claim:

1. Optical communications system for transmission of two optical signals, said system comprising:
    a single optical waveguide having an associated cutoff wavelength above which light can only be propagated in the fundamental mode between a first end and a second end,
    two optical transmitters for producing two respective optical signals which each have a different wavelength clearly below the cutoff wavelength and which are each transmitted in a different waveguide mode,
    two optical receivers, each associated with a respective said optical transmitter for receiving a respective one of said two optical signals, and
    two monomode fusion couplers which are each fabricated from two fibers dissimilar in core and mantle diameter for connecting each of the optical transmitters and the optical receivers to said first or second end of said single optical waveguide.

2. System according to claim 1, wherein:
    a first said optical signal is transmitted in the fundamental mode,
    an associated first fiber of both said fusion couplers is a standard monomode fiber coupled between the waveguide and a respective first optical transmitter or first optical receiver,
    a second said optical signal is transmitted in a mode higher than the fundamental mode,
    the second fiber of a first said fusion coupler is thinner than the standard monomode fiber and is coupled between the waveguide and the second transmitter, and
    the second fiber of the second said fusion coupler is thicker than the standard monomode fiber and is coupled between the waveguide and the second receiver.

3. System according to claim 2, further comprising a wavelength-selective demultiplexer between each said optical receiver and its respective said fusion coupler.

4. System according to claim 3, wherein each said wavelength-selective demultiplexer is a wavelength-selective monomode fiber-fusion coupler.

5. System according to claim 4, wherein all said fusion couplers are separate optical components.

6. System according to claim 4, wherein each said wavelength-selective demultiplexer is combined with at least one other said fusion coupler into a common optical component.

7. The system according to claim 1, wherein said system is a diplex system and both said transmitters are coupled to the first end of the waveguide and both said receivers are coupled to the second end of the waveguide.

8. The system according to claim 1, wherein said system is a duplex system and one transmitter and one receiver are coupled to each said end of the waveguide.

9. The system according to claim 1, wherein said system is a diplex system and both said transmitters are coupled to the first end of the waveguide and both said receivers are coupled to the second end of the waveguide.

10. The system according to claim 1, wherein said system is a duplex system and one transmitter and one receiver are coupled to each end of the waveguide.

11. Optical communications system for transmission of two optical signals, said system comprising:
    a single optical waveguide having an associated cutoff wavelength, above which light can only be propagated in the fundamental mode between a first end and a second end,
    a first optical transmitter for producing a first optical signal which has a wavelength above the cutoff wavelength and which is transmitted in a fundamental mode,
    a second optical transmitter for producing a second optical signal which has a wavelength below the cutoff wavelength and which is transmitted in a next higher mode above the fundamental mode,
    two optical receivers, each associated with a respective said optical transmitter for receiving a respective one of said two optical signals, and
    a first monomode fiber-fusion coupler fabricated from two exactly similar fibers at the first end of the waveguide for connecting two respective ones of said two optical transmitters and said two optical receivers to said first end,
    a second monomode fiber-fusion coupler fabricated from exactly similar fibers at the second end of the waveguide for connecting the remaining ones of said two optical transmitters and said two optical receivers to said second end.

12. System according to claim 11 further comprising:
    a wavelength-selective demultiplexer between each said optical receiver and its respective said fusion coupler.

13. System according to claim 12, wherein each said wavelength-selective demultiplexer is a wavelength-selective monomode fiber-fusion coupler.

14. System according to claim 13, wherein all said fusion couplers are separate optical components.

15. System according to claim 13, wherein each said wavelength-selective demultiplexer is combined with at least one other said fusion coupler into a common optical component.

* * * * *

UNITED STATES PATENT AND TRADEMARK OFFICE
CERTIFICATE OF CORRECTION

PATENT NO. : 5,050,952
DATED : September 24, 1991
INVENTOR(S) : Kurt Fussgänger It is certified that error appears in the above-identified patent and that said Letters Patent is hereby corrected as shown below:

On the Front Page:

[75] Inventor, change "Kurt Fussgäger" to
-- Kurt Fussgänger --.

[56] References Cited, U.S. PATENT DOCUMENTS, change
"4,834,481   3/1989" to -- 4,834,481   5/1989 --.

Column 3, line 38, change "$\lambda_2$and" to -- $\lambda_2$ and --.

Column 4, line 11, change "length, Which" to
-- length, which --.
Column 4, line 18, change "(transmitter-receiver, side)" to
-- (transmitter-receiver side) --.

Column 5, line 31, change "=L Coupler" to -- L=Coupler --.
Column 5, line 47, after "a" change "Way" to -- way --.
Column 5, line 58, after "will" change "no" to -- now --.

Signed and Sealed this

Sixteenth Day of March, 1993

*Attest:*

STEPHEN G. KUNIN

*Attesting Officer*          *Acting Commissioner of Patents and Trademarks*